(12) United States Patent
Spencer

(10) Patent No.: US 6,823,439 B2
(45) Date of Patent: Nov. 23, 2004

(54) MESSAGE LOGGING

(75) Inventor: Thomas V. Spencer, Ft. Collins, CO (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 155 days.

(21) Appl. No.: 10/288,616

(22) Filed: Nov. 4, 2002

(65) Prior Publication Data
US 2004/0088517 A1 May 6, 2004

(51) Int. Cl.[7] .............................................. G06F 12/00
(52) U.S. Cl. ....................................................... 711/171
(58) Field of Search ................................. 711/170, 171, 711/172, 156

(56) References Cited

U.S. PATENT DOCUMENTS 5,680,457 A * 10/1997 Bestler et al. ............... 380/239

* cited by examiner

Primary Examiner—Kevin L. Ellis
(74) Attorney, Agent, or Firm—Morrison & Foerster LLP

(57) ABSTRACT

A method includes storing a plurality of system status messages of a specified size, and transmitting the status messages as a combined status message of a size larger than said specified size to an external device. In one aspect, the system status messages may have sizes that are less than the width of a bus, and said transmitting the combined status message includes transmitting the combined status message having a width equal to a width of the bus.

22 Claims, 2 Drawing Sheets

MESSAGE LOGGING

TECHNICAL FIELD

This application relates to logging messages.

BACKGROUND

Messages that indicate a condition of a processor may be logged (e.g., stored and saved) during execution of programs and/or during debugging of the processor. The messages are useful to a programmer or user of the processing unit to determine whether the processor is operating properly. Typically the memory resources available on the processor are limited, therefore messages are stored on an external memory.

DESCRIPTION

Figure 1:
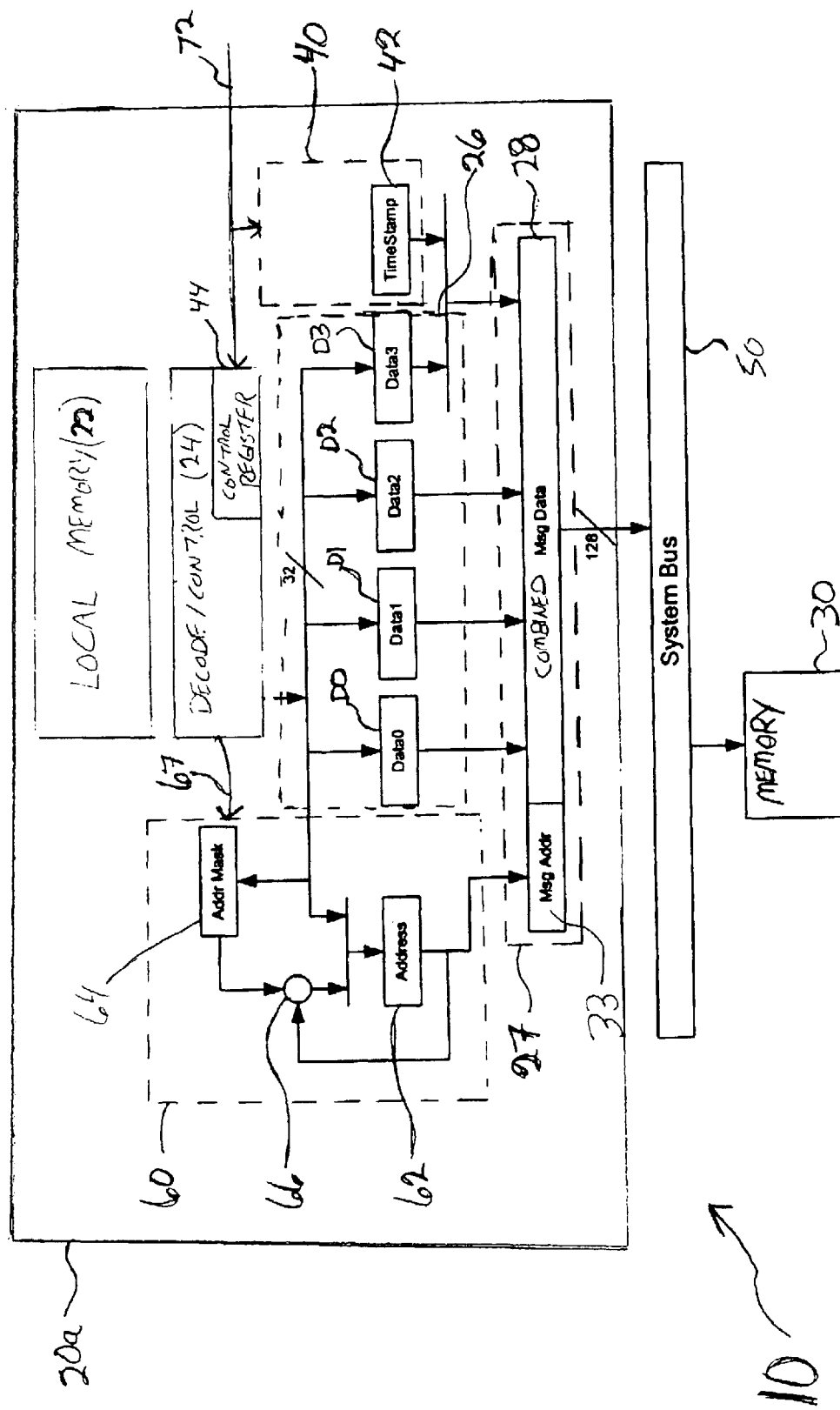
FIG. 1 is a block diagram of a processing system.

FIG. 1 shows a system 10 that includes a processor 20a and a memory 30 coupled to a system bus 50. In operation, processor 20a and memory 30 transmit data, messages and/or instructions to each other on system bus 50. Processor 20a includes a local memory 22 for holding instructions and/or data, and decode and control logic 24 for decoding instructions and sending control signals to control the operation of logic included in the processor. In an embodiment, processor 20a includes status message logic 26 for storing individual status messages and combining those messages in a combined message 28 that may be stored on memory 30. The status messages may include information to indicate, for example, a state of a logic block included in processor 20a, information related to the execution of a program or a portion of a program (e.g., a sub-routine or function), data processing information such as a data packet count, a data packet identifier, etc.

In an embodiment, status message logic 26 includes four (4) status message registers D0–D3, each 32-bits in length, to store individual status messages from processor 20a. In operation of system 10, status messages stored in registers D0–D3 are transmitted as a combined 128-bit message 28 on bus 50 and stored in memory 30. In this example of system 10, system bus 50 is 128-bits wide. Therefore, this allows combining relatively short messages (e.g., 32-bit messages) from registers D0–D3 as a relatively long (128-bit) combined message 28.

Sending combined messages allows the full-width of bus 50 to be used when the combined message is transmitted on the bus. This may also increase the effective use of bus 50 since fewer messages need to be sent (i.e., messages that are less than the full-width of bus 50). Further, this may improve the efficient use of memory 30 since a read-modify-write operation is not required to update an error correcting code (ECC), as may be required in a conventional system. Moreover, this way of sending combined messages for storage on an external device allows the operation of a processor to be determined where direct observation of the operation is not possible, for example, where a processor is implemented as an embedded system with limited options to observing processor behavior during operation.

In operation of system 10, instruction(s) executed by processor 20a may cause individual status messages, up to 32-bits in length, to be stored in each of message registers D0–D3. When each registers D0–D3 has a status message stored, processor 20a generates a next address 33 of a location in memory 30. Next address 33 and combined message 28 are then sent on bus 50 as a command which stores combined message 28 in memory 30.

In an embodiment, processor 20a includes timestamp logic 40 that is used to generate and store a timestamp value in a timestamp register 42. The timestamp value may be based upon a counter value, e.g., a value representing a count of processor clock cycles. In an embodiment, timestamp value stored in timestamp register 42 is included in combined message 28 in place of a status message from register D3. The timestamp value provides an indication to a user (e.g., a programmer) of system 10 of when, during execution of a program by processor 20a, a corresponding combined message was written to memory 30.

Processor 10 includes bus interface logic 27 coupled to system bus 50. During operation of processor 10, bus interface logic 27 holds and transmits combined message 28 and next address 33 on bus 50.

In an embodiment, message registers D0–D3 are "aliased" into two different address spaces, each address space usable to cause the inclusion or non-inclusion of the timestamp value in the combined message 28. In more detail, a register write command (e.g.) that specifies an address in the first address space that corresponds to registers D0–D2 will cause the storing of a status value into the corresponding register, D0–D2, respectively. A register write command that specifies an address in the first address space that corresponds to register D3 will cause the storing of a status value in D3 and also cause the combined message 28 to be transmitted on bus 50 to be stored on memory 30. By contrast, a register write command (e.g.) that specifies an address in the second address space that corresponds to D2 will cause the storing of a status value in D2, and also cause the timestamp value from timestamp register 42 to be included in combined message 28, and also cause the combined value (including timestamp value) to be transmitted on bus 50 to be stored on memory 30.

Example 1 (shown below) depicts an exemplary set of "C" code instructions corresponding to the use of the first address space. The instructions shown in Example 1 may be used on system 10 to cause individual status messages to be stored in registers D0–D3, and then transmitted as a combined message 28 to memory 30. In Example 1, address_space1 is equal to a value of "0x10160000", which corresponds to an address of a message register D0 in the first address space (i.e., no timestamp value to be included in combined message XX):

Example 1:

| | | |
|---|---|---|
| *(address_space1) | = msg_data0; | // Store msg_data0 in D0 |
| *(address_space1 + 1) | = msg_data1; | // Store msg_data1 in D1 |
| *(address_space1 + 2) | = msg_data2; | // Store msg_data2 in D2 |
| *(address_space1 + 3) | = msg_data3; | // Store msg_data3 in D3 and transmit the entire message on bus 50 |

Example 2 (shown below) depicts an exemplary set of "C" code instructions corresponding to the use of the second address space. The instructions shown in Example 2 may be used on system 10 to cause the timestamp value stored in timestamp register 42 to be included in combined message 28. Example 2 includes only three (3) instructions (in contrast to Example 1, which includes four (4) instructions). The third instruction in Example 2 will cause processor 20a to store a status message in D2 and include the timestamp value in combined message 28. In Example 2, address_ space2 is equal to "0x10160010" which corresponds to an address of message register D0 in the second address space.

Example 2:

| | | |
|---|---|---|
| *(address_space2) | = msg_data0; | // Store msg_data0 in D0 |
| *(address_space2 + 1) | = msg_data1; | // Store msg_data1 in D1 |
| *(address_space2 + 2) | = msg_data2; | // Store msg_data2 in D2, timestamp value in D3 and transmit combined message on bus 50. |

In this example of system 10, processor 20a is connected to a reset line 72. In operation, when system 10 is powered on a reset signal is received by processor 20a on line 72. The reset signal may cause processor 20a to begin execution of a program stored in local memory 22. In an embodiment, processor 20a includes status message control register 44. The individual bit(s) of status message control register 44 may be used to enable and/or disable certain operations of status message logic 26. For example, one or more bit fields of control register 44 may be used to indicate whether status messages are to be logged during program execution, or whether a combined message should be sent to memory 30 whenever all four message registers D0–D3 are full, etc. In this example of system 10, the reset signal sent on line 72 at power on may cause decode/control logic 24 to set and/or clear bits in control register 44, to enable or disable the storing of combined messages on memory 30. In another embodiment, control register 44 may be read and/or written by decode and control logic 24 during execution of an instruction on processor 20a.

In an embodiment, combined status messages are stored on "circular" queue structures on memory 30. Circular queue refers to a queue structure where data is stored in consecutive locations on a queue, beginning at a first location and continuing until an end ("tail") location is reached. When the tail location has been written, a pointer to the next location to be written ("head" location) on the queue "wraps" to point to the first location. Therefore, subsequent data written to the queue will over-write data already stored on the queue.

In an embodiment, processor 20a includes address generation logic 60 that is used to generate next address 33 corresponding to a location on memory 30 for storage of combined message 28. Address generation logic 60 includes a base address register 62, an address mask register 64 and increment logic 66. During operation of system 10, a base address corresponding to the starting address of a circular queue assigned to processor 20a is stored in base address register 62, and a value indicating the size of that circular queue is stored in address mask register 64. Before a combined message 28 is sent to memory 30, decode and control logic 24 sends a signal on line 67 to cause address generation logic 60 to generate next address 33 on the circular queue for storing combined message 28. In this case, increment logic 66 increments the value stored in base address 62 using the value stored in mask address 64 to output next address 33. Once next address 33 is available, combined message 28 may be transmitted on bus 50 for storage on memory 30.

Figure 2:
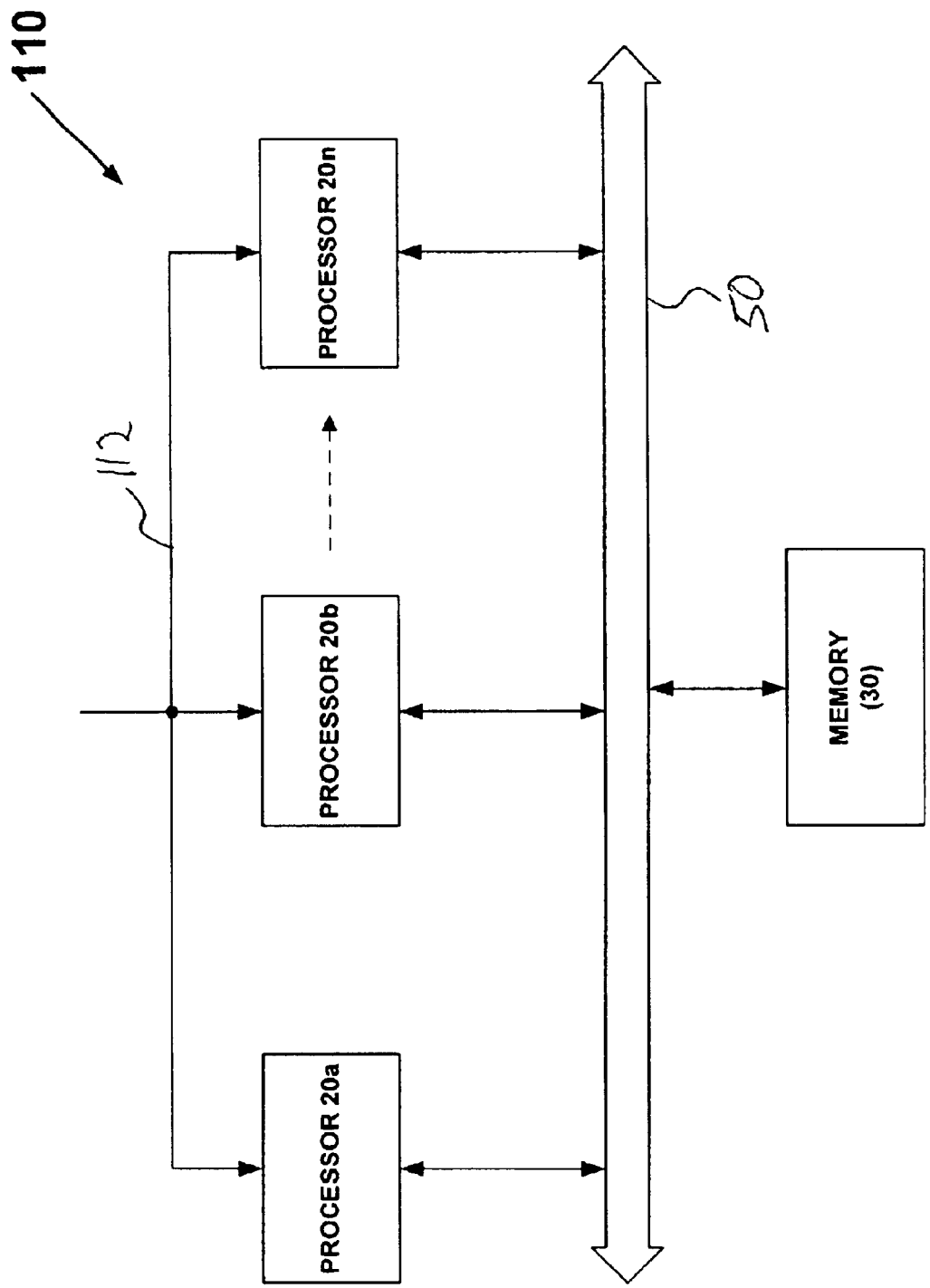
FIG. 2 is a diagram of a multi-processor system.

FIG. 2 shows a multiple processor system 110. System 110 includes processors 20a–20n, each coupled to receive a reset signal on line 112 at power-on of system 110. Processors 20b–20n are constructed in a similar fashion to processor 20a and operate in a similar fashion, as described previously. In operation of system 110, a reset signal is sent on line 112 to reset and synchronize the start of operations of each of the processors 20a–20n. For example, the reset signal may cause the setting and/or clearing of bits in a control register located on a processor, or cause execution of instructions by a processor, etc. In this embodiment, each processor 20a–20n may include status logging logic for transmitting combined messages on bus 50 for storage on memory 30.

In an embodiment, each processor is assigned a separate circular queue on memory 30, each circular queue having a separate address space. Using separate queues having separate address spaces for each processor may avoid data conflicts between processors when using a single memory, such as memory 30. Generating an address based on an assigned circular queue base address and queue size may reduce the time required to determine next address 33. Moreover, since each processor only uses a next address corresponding to its assigned circular queue address space, memory 30 does not need to identify the source of the message before storing a combined message.

In an embodiment, a size of a circular queue for each processor 20a–20n is programmable (e.g., selectable), and a size of each queue may be different for each processor.

In an embodiment of system 110, two or more of the processors 20a–20n may be performing operations in a cooperative or pipelined manner, e.g., each processor performing a different operation on a common data item or set of common data items (e.g., a data stream). In this case, the two processors may be executing different programs to perform different operations on the common data item(s). In order to debug operation of system 110, where two or more processors are operating in a cooperative or pipelined manner, the operations of each processor may be synchronized so that an event that occurs on one processor may be related to an event that occurs on another processor. In this example of system 110, time stamp registers included on each processor 20a–20n are cleared (or set to a value) by the reset signal on line 112 at power-on. The reset signal also starts execution of programs on each processor at about the same time. Therefore, as events occur on each processor 20a–20n, and combined messages that include timestamp value are stored on memory 30, the combined messages from different processors may be compared using a common reference (i.e., the synchronized timestamp values). This allows messages from all processors to be compared in the order that they were issued during the execution of a program, for example, during execution of test or diagnostic program. This may be useful to determine the behavior of system 110, or various components included in system 110.

In an embodiment, system 110 includes a system clock source (not shown) coupled to two or more of processors 20a–20n to send a common clock signal to the two or more of the processors 20a–20n during operation. The common clock signal may be used to further synchronize the operation of the two or more of the processors 20a–20n.

In some embodiments, each processor 20a–20n may include additional registers that may be used, for example, to enable and/or disable functions performed by that processor, or to store addresses and/or data.

Each processor 20a–20n may include an operating system, the operating system is software that controls the processor's operation and the allocation of resources. The term "process" or "program" refers to software, for example an application program that may be executed on a processor or computer system. The application program is the set of executable instructions that performs a task desired by the user, using computer resources made available through the operating system.

Processors 20a–20n are not limited to use with the hardware and software of FIGS. 1 and 2. It may find applicability in any computing or processing environment.

They may be implemented in hardware, software, or a combination of the two. They may be implemented in computer programs executing on programmable computers or other machines that each include a processor, a storage medium readable by the processor (including volatile and non-volatile memory and/or storage components), at least one input device, and one or more output devices. Program code may be applied to data entered using an input device (e.g., a mouse or keyboard) to perform applications and to generate output information.

Each computer program may be stored on a storage medium/article (e.g., CD-ROM, hard disk, or magnetic diskette) that is readable by a general or special purpose programmable computer for configuring and operating the computer when the storage medium or device is read by the computer to perform applications. They may also be implemented as a machine-readable storage medium, configured with a computer program, where, upon execution, instructions in the computer program cause a machine to operate in accordance with those applications.

The invention is not limited to the specific embodiments described above. For example, the above has described using 32-bit message registers for storing status message and combining those status messages into a combined 128-bit message. Other message sizes, register sizes and combined message sizes could be used. The above has described including a timestamp value in the combined message by using aliased addressed spaces. However, other addressing methods and/or instructions could be used to cause the inclusion of a timestamp value in a combined message. The above has described storing messages on a memory. However, the messages could be stored on an external device coupled to the system bus, for example, a storage medium/article (e.g., CD-ROM, hard disk, or magnetic diskette), or the memory may be implemented as a type of random access memory, and may be controlled by logic (e.g., memory controller logic) when accessed by a read or write operation. The above has described generating the next address following the storing of status messages in registers D0–D3. However, the next address may be generated before or at about the same time that the final status message in stored in registers D0–D3.

Other embodiments not described herein are also within the scope of the following claims.

What is claimed is:

1. A method comprising:
   storing a plurality of system status messages of a specified size; and
   transmitting the status messages as a combined status message of a size larger than said specified size to an external device;
   wherein said system status messages have sizes that are less than the width of a bus; and
   wherein said transmitting the combined status message comprises transmitting the combined status message having a width equal to a width of the bus.

2. The method of claim 1, further comprising:
   generating an address corresponding to a location on the external device, wherein transmitting further comprises:
   transmitting the address and the combined status message substantially simultaneously.

3. The method of claim 2, wherein the address corresponds to an address of a location on a circular queue structure.

4. The method of claim 3, wherein generating an address further comprises:
   determining the address based upon a starting address of the circular queue and a size of the circular queue.

5. The method of claim 1, further comprising:
   generating a time stamp value,
   wherein the combined message includes at least one of the plurality of system status messages and also includes the time stamp value.

6. The method of claim 1, further comprising:
   sending combined status messages from a plurality of processors to the external device, wherein the combined messages include a timestamp value generated by each processor, and wherein the timestamp values are synchronized.

7. The method of claim 6, wherein each of the processors sending a combined message has a circular queue assigned on the external device to store combined messages, and wherein each of the assigned circular queues has a separate address space.

8. A processor comprising:
   a control logic block coupled to receive and decode instructions;
   a status message logic block, said status message logic block having a plurality of status registers to store a plurality of system status messages, said status message logic block coupled to receive a control signal from the control logic block; and
   a bus interface couplable to a bus, said bus interface coupled to receive the plurality of status messages from the plurality of status registers, said bus interface to transmit the plurality of system status messages as a combined status message from the bus interface for storage on an external device.

9. The processor of claim 8, wherein said bus interface further comprises an output bus having a bit-width at least as wide as a bit-width of the combined status message.

10. The processor of claim 9, wherein said bus interface is coupled to a bus, said combined status message transmitted on said bus to the external device.

11. The processor of claim 9, further comprising:
    address generation logic to generate an address for storage of the combined message on the external device.

12. The processor of claim 11, said bus interface operative to transmit said combined status message and said address substantially simultaneously.

13. The processor of claim 11, said external device storing the combined status message on a circular queue structure, said circular queue structure having a size, said circular queue structure having a base address assigned to the processor.

14. The processor of claim 13, said address generation logic coupled to receive the base address corresponding to a head location of the assigned circular queue, and also coupled to receive an address mask corresponding to the size of the assigned circular queue.

15. The processor of claim 14, said address generation logic generating said next address based upon the assigned base address and size of the circular queue.

16. The processor of claim 14, wherein said address generation logic further comprises a base address register, an address mask register and an incrementer, said address generation logic coupled to receive a generation signal from the control logic block, said address gernation logic block operative to generate the address upon receipt of the generation signal from the control logic block.

17. The processor of claim 10, further comprising:
    time stamp logic to generate a time stamp value, wherein said bus interface is coupled to receive the time stamp value from the time stamp logic and include the received time stamp value in the combined status message.

18. The processor of claim 17, wherein the timestamp logic is operative to generate a time stamp value representative of at least one of a cycle count of the processor, and an instruction execution count of a program.

19. The processor of claim 8, further comprising a control register, the control register including a plurality of bit locations, at least one of the bit locations usable by the control logic to determine whether a combined status message may be transmitted from the bus interface.

20. A processor system comprising:

a system bus;

a plurality of processors coupled to the system bus, at least two of the plurality of processors including status message logic to store a plurality of processor status messages; and a memory coupled to the system bus to send data to and receive data from the plurality of processors, at least one of the processors operative to send a combined status message that includes a plurality of processor system messages for storage on the memory.

21. The processor system of claim 20, wherein at least one of the processors further comprises a bus interface, said bus interface including an output bus having a bit-width at least as wide as a bit-width of the combined status message.

22. The processor system of claim 20, wherein at least two of the plurality of processors further comprises time stamp logic to generate a time stamp value, wherein the processor system further comprises:

a reset line coupled to send a reset signal to the at least two processors, the reset signal operative to synchronize the timestamp values on each of the at least two processors.

* * * * *